UNITED STATES PATENT OFFICE.

RUDOLF TAMBACH, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

CASEIN DERIVATIVES OR COMPOUNDS AND PROCESS OF MAKING SAME.

967,584.

Specification of Letters Patent. Patented Aug. 16, 1910.

No Drawing. Application filed April 10, 1908. Serial No. 426,340. (Specimens.)

*To all whom it may concern:*

Be it known that I, RUDOLF TAMBACH, a subject of the German Emperor, residing at Ludwigshafen-on-the-Rhine, Germany, have invented certain new and useful Casein Derivatives or Compounds and Process for the Manufacture of the Same, of which the following is a specification.

If alkali-hypochlorites or chlorin be allowed to act in the presence of excess of alkali or until the commencement of the acid reaction and in the cold or in the heat upon casein which has been dissolved in solutions of alkalies or alkali carbonates, simultaneous oxidation and chlorination of the casein takes place, with formation of new compounds, which are precipitated on the addition of acids. These casein derivatives possess powerful putrefaction-arresting properties, so that in weak alkaline solutions for example, they prevent the putrefaction of pancreas for days and weeks. This behavior would appear to render the preparations admirably suitable as intestinal antiseptics, if their small capability of resisting the juice of the stomach were not obstructive to their use.

I have found, that these new casein derivatives on treatment with tannic acid compounds unite with the latter, and that these compounds are capable of resisting the juices of the stomach in a high degree, but are soluble in water which has been rendered alkaline, so that the antiseptic properties of the components can come into full action in the intestines. The compounds which can thus be prepared are yellowish-gray powders. They are almost insoluble in water and dilute acids, but are easily soluble in alkalies. The aqueous decoction is colored blue by iron chlorid (ferric chlorid) solution and gives a precipitate with a solution of egg-albumen; they are insoluble in the cold in alcohol and in chemically inert solvents.

Example I: 1 kilogram of casein is dissolved by 10 liters of water and 2 liters of a 20 per cent. caustic soda solution, the solution heated for two hours at 75 to 80° C., with two liters of a 10 per cent. sodium hypochlorite solution, then filtered from the slight residue, and the chloro-casein derivative is precipitated from the filtrate by strong hydrochloric acid and dried. 1 kilogram of this chlorocasein derivative is stirred up with 10 liters of water and brought into solution by the addition of caustic soda solution and then mixed with 10 liters of a 10 per cent. solution of tannin. The new compound thus formed is separated out by the addition of acids in the cold or in the heat, washed with water, dried, pulverized and sifted.

Example II: 1 kilogram of chlorocasein derivative is dissolved in the amount of dilute spirit necessary to dissolve it, and treated with 1 kilogram of tannin in alkaline or aqueous solution. The new compound is separated out by the addition of acids and afterward treated as above.

The alkaline liquor obtained in the chlorination of the casein may also be treated directly with tannin solution and the new product separated out by acids.

The compounds of tannic acid with the new chlorinated casein derivatives are to be used therapeutically in disorders of the intestines.

What I claim is:—

1. The process for the manufacture of compounds of chlorinated casein derivatives with tannic acid, which consists in treating the said chlorinated casein derivatives obtained by the action of chlorin on casein in alkaline solution, in solution with tannic acid, separating out the compounds thus produced, with acids, washing them with water and drying, substantially as described.

2. As new products, compounds of chlorinated casein derivatives with tannic acid, the said compound, being obtainable as yellowish-gray powders, insoluble in cold alcohol, almost insoluble in water and in dilute acids, soluble in alkalies, assuming a blue color when treated in aqueous decoction with ferric chlorid, forming a precipitate with albumen solutions, and offering great resistance to the juices of the stomach, substantially as described.

In testimony whereof I have hereunto set my hand in presence of two subscribing witnesses.

RUDOLF TAMBACH.

Witnesses:
HERMANN TAEGER,
JOS. H. LEUTE.